United States Patent [19]

Wehling

[11] Patent Number: 5,350,284
[45] Date of Patent: Sep. 27, 1994

[54] PERISTALTIC PUMP

[75] Inventor: Werner Wehling, Dorsten, Fed. Rep. of Germany

[73] Assignee: Allweiler AG, Radolfzell, Fed. Rep. of Germany

[21] Appl. No.: 60,032

[22] Filed: May 10, 1993

[30] Foreign Application Priority Data

May 11, 1992 [DE] Fed. Rep. of Germany ....... 4214916

[51] Int. Cl.⁵ .............................................. F04B 43/08
[52] U.S. Cl. .................................. 417/474; 417/477 R
[58] Field of Search ................................. 417/474–479

[56] References Cited

U.S. PATENT DOCUMENTS

| 1,765,360 | 6/1930 | Baumann | 417/477 |
| 2,231,579 | 2/1941 | Huber | 417/476 |
| 3,105,447 | 10/1963 | Ruppert | 417/475 |
| 3,180,272 | 4/1965 | Broadfoot | 417/475 |
| 4,484,864 | 11/1984 | Michel | 417/477 |
| 4,997,347 | 3/1991 | Roos | 417/477 |
| 5,242,279 | 9/1993 | Knuth | 417/474 |

FOREIGN PATENT DOCUMENTS

| 3420861 | 12/1985 | Fed. Rep. of Germany . | |
| 851636 | 1/1940 | France . | |
| 2094506 | 2/1972 | France . | |
| 3-26887 | 2/1991 | Japan | 417/477 |
| 034529 | 5/1972 | U.S.S.R. . | |
| 628785 | 9/1949 | United Kingdom | 417/477 |

Primary Examiner—Richard A. Bertsch
Assistant Examiner—Korytnyk: Peter
Attorney, Agent, or Firm—Bachman & LaPointe

[57] ABSTRACT

In a peristaltic pump comprising a pump tube with elastically deformable wall, which pump tube is arranged in a pump housing and is fitted into the pump housing with a portion which is curved in a part-circular configuration around a shaft of a rotor of the peristaltic pump and at a radial spacing from the shaft, the cross-section of the pump tube being partially varied during the conveying operation with a reduction in the internal volume. The connection ends of the pump tube are accessible from the exterior and are fixed in the region of wall connections or the like members of the pump housing. The tube end of the pump tube is clamped in a wall connection approximately between the inside diameter (d) of the pump housing and a tangent (Q) to the inside surface of the wall of the pump housing through the intersection (N) thereof with the pump diameter (D) which is approximately parallel to the center lines (M) of the wall connections.

10 Claims, 2 Drawing Sheets

PERISTALTIC PUMP

The invention relates to a peristaltic pump comprising a pump tube with elastically deformable wall, which pump tube is arranged in a pump housing and is fitted into the pump housing with a portion which is curved in a part-circular configuration around a shaft of a rotor of the peristaltic pump and at a radial spacing from the shaft, the cross-section of the pump tube being partially varied during the conveying operation with a reduction in the internal volume, wherein the connection ends of the pump tube which are accessible from the exterior are fixed in the region of wall connections or the like members of the pump housing.

A peristaltic pump of that kind is described in German patent specification No. 32 48 573, having a pump tube and a pair of pressure rollers which in the interior of the tube produce a chamber portion which is closed off by two squeeze locations. When the rotor rotates the pressure rollers roll against the stationary pump tube which bears against the wall of the housing, and the squeeze locations are displaced with the pressure rollers in the conveying direction whereby the material to be conveyed, which is in the interior of the tube, is conveyed from the tube intake to the discharge end of the pump tube; the squeeze location which is adjacent the pump intake, by virtue of the return force of the tube wall, produces a suction force on the incoming material to be conveyed, which is then transported by the above-described chamber portion to the discharge end of the pump tube. The free ends of the pump tube are each provided with a respective flange collar formed thereon, which is clampingly held in a pair of flanges of the wall connection outside the actual pump housing at a spacing relative to the wall thereof.

It is also known for the tube ends to be clamped by means of tube clips outside the pump housing.

At any event the clamping locations are relatively far from the operating region of the displacer, which results in long free upsetting/kinking/bending lengths of the pump tube and, as a consequence, a high degree of pressing and squeezing work at the free end, on the pressure side, of the pump tube. Experience has shown that the service life of the pump tube is very short in that region, as a result of the above-indicated influences. Furthermore additional components are essential for sealing off the pump tube relative to the pump housing.

These deficiencies are of major significance not least for the reason that on the one hand, in particular when dealing with dirty or corrosive agents to be conveyed, bursting or rupture of a pump tube can result in extremely undesirable contamination of the area around the pump, while on the other hand replacing the pump tube is particularly expensive.

SUMMARY OF THE INVENTION

In consideration of those factors the inventor set himself the aim of providing a peristaltic pump of the kind described in the opening part of this specification, with which the deficiencies encountered are overcome.

The present invention provides for attainment of that object.

In accordance with the invention the end of the pump tube is clamped in the wall connection approximately between the inside diameter of the pump housing and a tangent to the inside surface of the wall of the pump housing through the intersection thereof with the pump diameter which is approximately parallel to the center lines of the wall connections, in a preferred embodiment near the inside diameter of the pump housing.

In accordance with a further feature of the invention the tube end clamping region is determined by a shoulder-like gland base or bottom, the spacing of which relative to the inside surface of the wall approximately corresponds to the thickness thereof.

In accordance with the invention, at least one packing ring of elastic material, preferably an elastomer gland, is clamped between the gland base and a gland cover or the like closure element of the wall connection, and between the wall of the wall connection and the pump tube.

At least one gland base ring is additionally arranged between the gland base and the packing ring, for positional securing purposes.

By virtue of those features, a reduction is achieved in the above-mentioned upsetting/kinking/bending lengths of the pump tube by the pump tube being clamped directly at the inside diameter of the pump housing; in addition pump tube clamping is effected by means of elastomer glands in order to reduce the specific clamping forces at the pump tube and for simultaneously sealing off the pump tube relative to the pump housing.

That purpose is also served by the feature of making the diameter of the wall connection somewhat larger than the outside diameter of the pump tube in order to ensure closely fitting deformation of the elastomer gland.

Advantageously, a pump connection is inserted into the tube interior towards the end and held to the gland cover or the like closure element by means of an external rib projecting therefrom; the pump connection bears with its insertion portion internally against the cross-section of the pump tube at least in the clamping region thereof and supports it in such a way as to maintain its shape.

The invention thus provides an increase in the service life of the pump tube in the portion between the working region and the clamping location at the pressure side, and thus a marked improvement in operating life generally.

BRIEF DESCRIPTION OF THE DRAWINGS

Further advantages, features and details of the invention will be apparent from the following description of a preferred embodiment and with reference to the drawing in which.

DETAILED DESCRIPTION OF PREFERRED EMBODIMENTS

Figure 1:
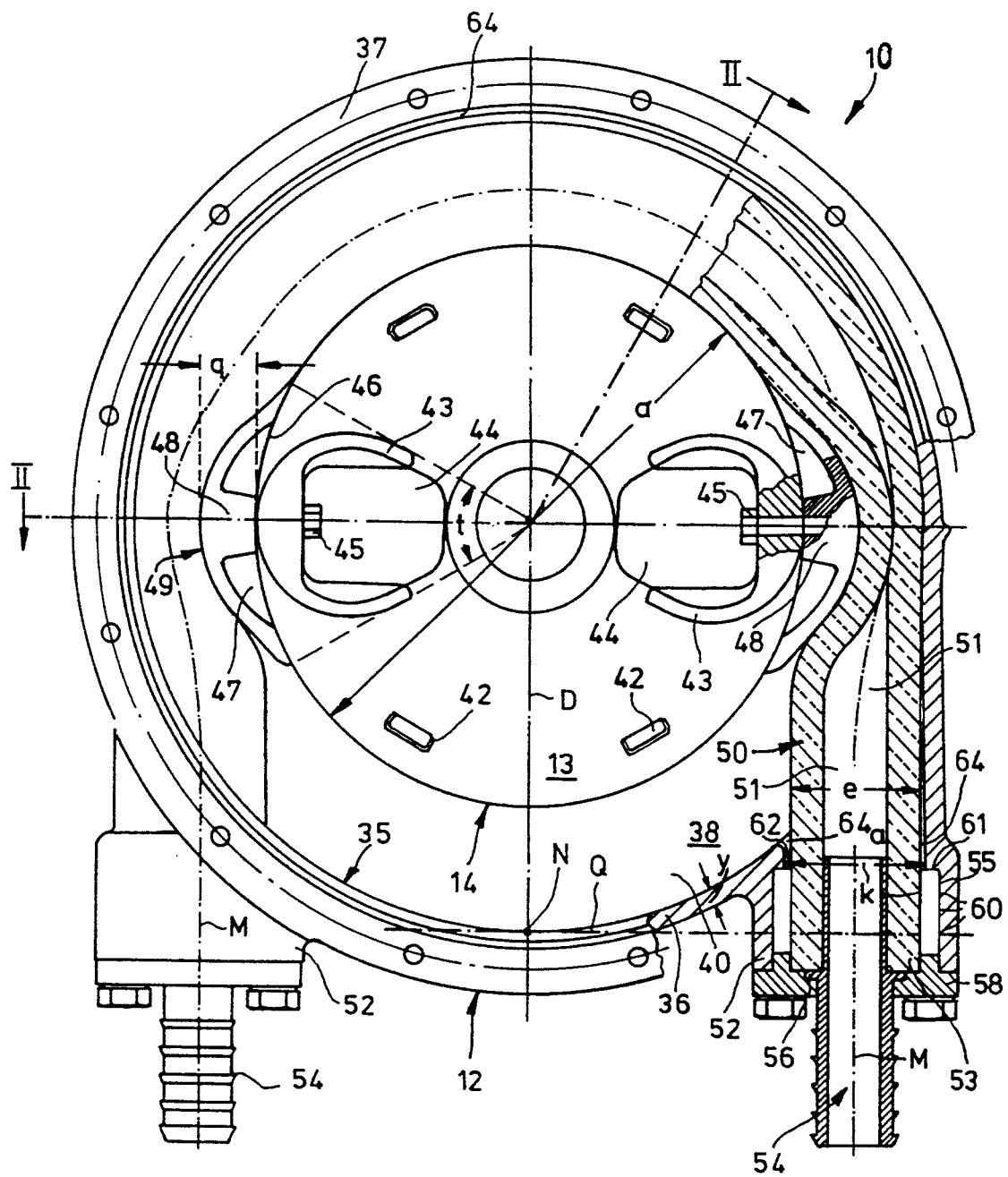
FIG. 1 is a plan view of a pump partly in section.

A peristaltic pump 10 has a dish-like pump housing 12 of an inside diameter d of about 320 mm and a height h of about 75 mm, and, in the pump housing 12, a rotor 14 which is rotatable on a pump shaft 16 about the axial line A thereof.

The pump shaft 16 is mounted in the region of a central bearing neck 18, of a mean outside diameter b of about 95 mm, of the pump housing 12 which comprises rigid material and which is preferably cast from metal. The pump shaft 16 is mounted by means of an axial thrust bearing 20 and a radial bearing 22, between which a spacer bush 24 embraces the pump shaft 16.

The spacer bush 24 is surrounded by a securing ring 26 for the thrust bearing 20 and a securing ring 27 for the radial bearing 22. Reference 28 identifies a space for bearing grease between the securing rings 26, 27, while reference 30 identifies a spacer ring for the thrust bearing 20 within an intermediate ring 26a, adjacent which is an outer splash ring 32. On the rotor side, a sealing element 34 adjoins the radial bearing 22 at an outer support ring 27a towards the rotor 14.

Figure 2:
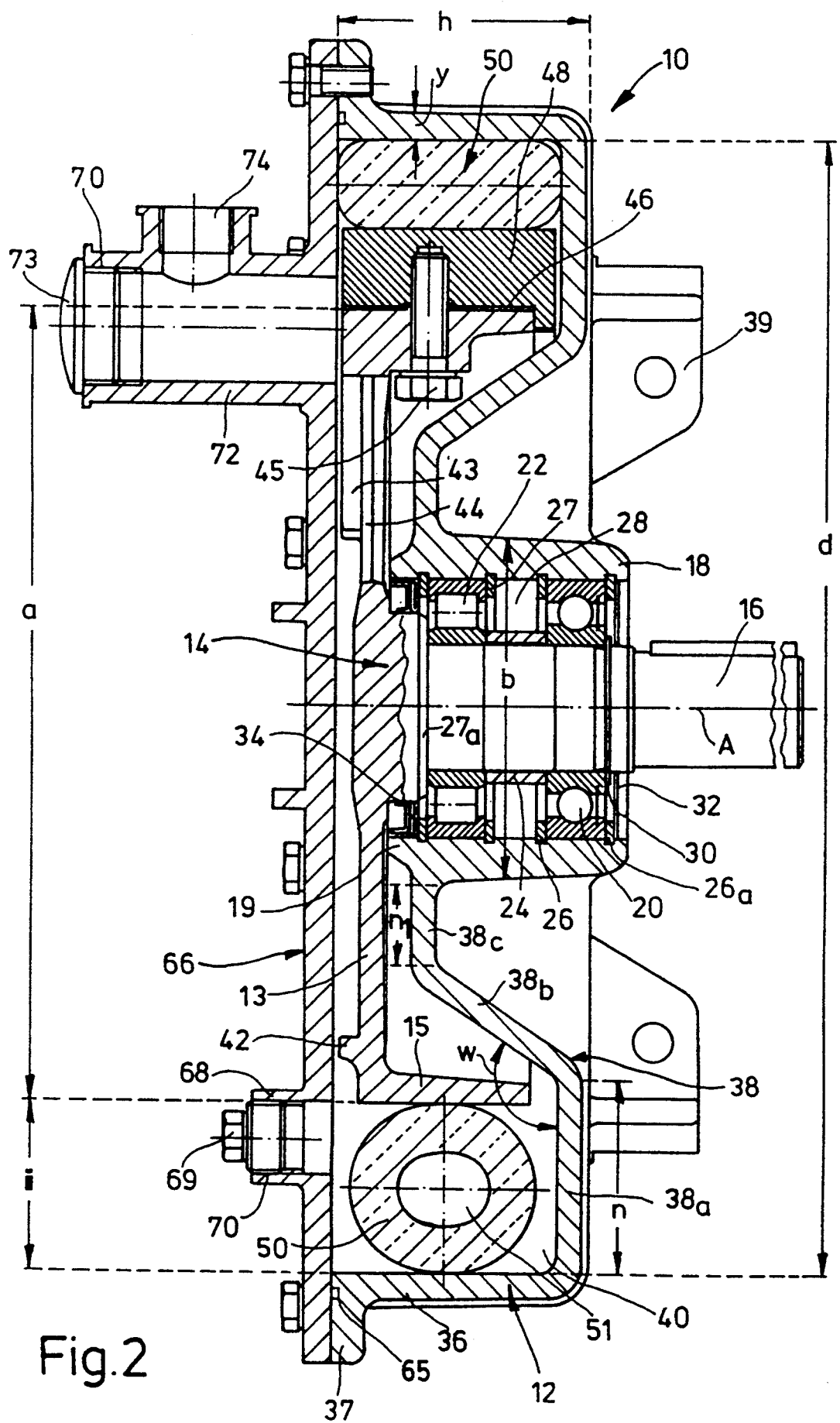
FIG. 2 is a view in section through FIG. 1 taken along line II—II therein.

As shown in FIG. 2, the bottom 38 which is formed on the wall 36 of the pump housing 12 is composed in terms of cross-section of a bottom portion 38a which is approximately at a right angle to the wall 36 and which has a cross-section length n of rather more than 55 mm, an inclined bottom portion 38b which extends from the bottom portion 38a at an inclined angle w of about 120°, and an annular bottom portion 38c of a cross-section length nl of about 25 mm which extends parallel to the first-mentioned bottom portion 38a from the inclined bottom portion 38b to the bearing neck 18 and which is formed on same. The bearing neck 18 projects slightly with an annular rib 19 that accommodates the above-mentioned sealing element 34, axially beyond the annular bottom portion 38c towards the rotor 14.

The wall 36 and the adjoining bottom portion 38a of the pump housing 12, with the inclined bottom portion 38b, define a substantially annular channel space 40. Connection plates 39 for pump mounting purposes are cast on the outside of the bottom 38.

The rotor 14 which is formed on the pump shaft 16 is designed, also in a dish-like configuration, with a rotor wall 15 which extends from a rotor end portion 13 and which engages in the channel space 40, which is filled with lubricant or coolant, while shaped knobs 42 and conveyor vanes 43 which are horseshoe-like in plan view project from the outer surface of the rotor 14. The conveyor vanes 43 surround openings 44 in the rotor end portion 13, as can be seen in particular from FIG. 1. The outside diameter a of the rotor 14 measures about 220 mm so that the mean radial spacing i of the rotor wall 15 in the channel space 40 from the housing wall 36 works out at nearly 50 mm.

The rotor wall portion 15 has two screws 45 passing therethrough for fixing a respective adjustment plate 46 and slide shoe 48 which, as shown in FIG. 1, provides a curved slide surface 49 with a maximum spacing q of rather more than 20 mm from the rotor wall portion 15 and a length which is determined by an angle t of about 65°. The contour of the slide surface 49 in plan view approximately corresponds to that of half an oval, cut along the longer axis of the oval.

While the rotor 14 is rotated, the shoe 48, which is provided with through openings 47 of approximately triangular configuration in plan view, partially compresses a pump tube 50 of an outside diameter e of about 52 mm, which is arranged in the channel 40 between the wall 36 of the pump housing 12 and the rotor wall portion 15, in such a way that the volume of the tube interior 51 temporarily goes towards zero and thus there is formed within the pump tube 50 a conveyor chamber for the medium to be conveyed, for example ink or dye, industrial lye or solution, or the like; the medium to be conveyed is entrained by the described squeeze location during the rotary movement of the rotor 14.

The pump tube 50 of flexibly deformable material extends, as stated: in the channel space 40, in a U-shape between two mutually parallel wall connections 52 of the pump housing 12 and its tube ends 53 are each connected within the wall connections 52 to a respective enclosed pump connection 54. The latter is provided with an external radial rib 56 which bears on the inside against a gland cover 58 which is screwed to the wall connection 52, and projects into the interior 51 of the tube with an insertion portion 55 which terminates near the pump wall 36.

The gland cover 58 holds sealing rubber-elastic packing rings 60 and a gland base ring 61 which bears against a shoulder-like gland bottom or base 62. The distance of the gland base 62 from the inner side of wall 36 corresponds to the thickness y of the said wall 36 of about 8 mm.

One of the pump connections 54 forms the intake connection of the peristaltic pump 10, into which the medium to be conveyed is drawn by virtue of a suction force generated by the return force of the pump tube 50. The other pump connection 54 serves as a discharge for the medium conveyed.

The pump tube 50 is clamped directly at the wall 36 of the pump housing 12 at the inside diameter d. As shown in FIG. 1, the shoulder-like gland base 62 is situated between 1) the inside diameter d of the pump housing and 2) line Q which is the tangent through point N on the inside surface 35 of wall 36 and the pump diameter D which is parallel to the center lines M of wall connections 52.

The pump tube 50 is clamped by means of an elastomer gland 60 within the pump housing 12, which reduces the specific clamping forces on the pump tube 50 and in addition ensures sealing integrity thereof relative to the pump housing 12. FIG. 1 shows a gap 64 which tapers from the above-mentioned gland base towards the interior of the pump, between the inside surface 35 of the wall and the pump tube 50 which is mounted sealingly thereby; the latter does not contact the pump housing 12 at the clamping location, around the latter, as is confirmed by the spacing identified by reference 64a at the opposite side of the tube in FIG. 1, and the inside diameter k of the wall connection 36; it is larger than the outside diameter e of the tube.

The above-mentioned through openings 47 in the slide shoe 48 and apertures 44 in the rotor end portion 13 as return flow openings promote the coolant flow.

The wall 36 of the pump housing 12, towards the edge, becomes an external flange 37 which is formed thereon and on which fits, with the interposition of a sealing ring 65, a pump cover 66 which is screwed thereto. An outlet connection 68 of small diameter is formed on the pump cover 66 and can be closed by a closure screw 69 with sealing ring 70. Disposed adjacent the end of the pump cover 66, which is the upper end in FIG. 2, is a further bush configuration 72 which extends parallel to the axis of the pump and which is of a larger diameter than the outlet connection 68. The bush configuration 72 projects laterally of the path of movement of the rotor wall portion 15 and the slide shoe 48 and is provided axially with a sight glass 73 and radially with a branch portion 74 as a filling element.

I claim:

1. A peristaltic pump which comprises:
   a pump tube for conveying material with elastically deformable walls and connection ends, wherein the cross-section of the pump tube is partially varied during the conveying operation with a reduction in the internal volume thereof;
   a pump housing for the pump tube having wall connections thereof with center lines, and having a pump housing wall with an inside surface thereof and an inside diameter, wherein the pump tube is arranged in the pump housing and is fitted in the pump housing with a portion thereof which is curved in a part circular configuration, and wherein the pump tube ends are accessible from the outside of the pump housing;

a pump shaft and a pump rotor within the pump housing, wherein the curved portion of the pump tube is curved around the shaft at a radial spacing from the shaft;

wherein the tube ends of the pump tube form a U-shape in plan view and are fixed in the region of the wall connections of the pump housing;

wherein the tube connection ends of the pump tube are clamped in the wall connection of the pump housing between 1) the inside diameter d of the pump housing and 2) a tangent (Q) to the inside surface of the pump housing wall through the intersection thereof with the pump diameter (D) which is approximately parallel to the center lines of the pump housing wall connections; and at least one packing ring of elastic material clamped between the wall connection of the pump housing and the pump tube.

2. A pump according to claim 1 wherein at least one of the pump tube ends is clamped near the inside diameter (d) of the pump housing.

3. A pump according to claim 1 wherein the clamping region of the tube end is determined by a shoulder-like gland base whose spacing relative to the inside surface of the pump housing wall approximately corresponds to the thickness of the pump housing wall.

4. A pump according to claim 2 wherein at least one packing ring of elastic material is clamped between the gland base and a closure element of the pump housing wall connection.

5. A pump according to claim 4 wherein the closure element is a gland cover.

6. A pump according to claim 5 including an elastomer gland as the packing ring.

7. A pump according to claim 6 including a gland base ring provided between the gland base and the packing ring.

8. A pump according to claim 7 wherein the diameter of the pump housing wall connection at the gland base is larger than the outside diameter of the pump tube.

9. A pump according to claim 8 wherein a pump connection is inserted on the pump housing wall connections and is held to the gland cover by means of an outer rib projecting therefrom.

10. A pump according to claim 9 wherein the pump connection bears supportingly with an insert portion at the inside against the cross-section of the pump tube, at least in the clamping region thereof.

* * * * *